Nov. 24, 1953  D. D. HEAGERTY  2,660,396
PIVOTED SELF-ALIGNING VALVE
Filed Dec. 23, 1948
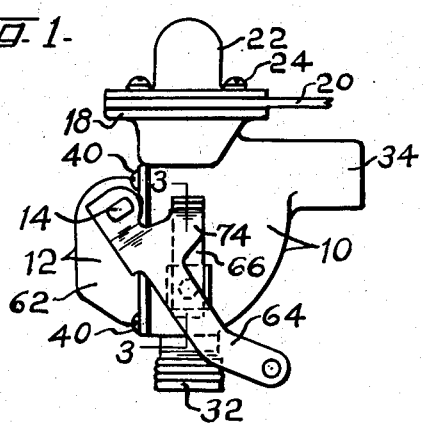
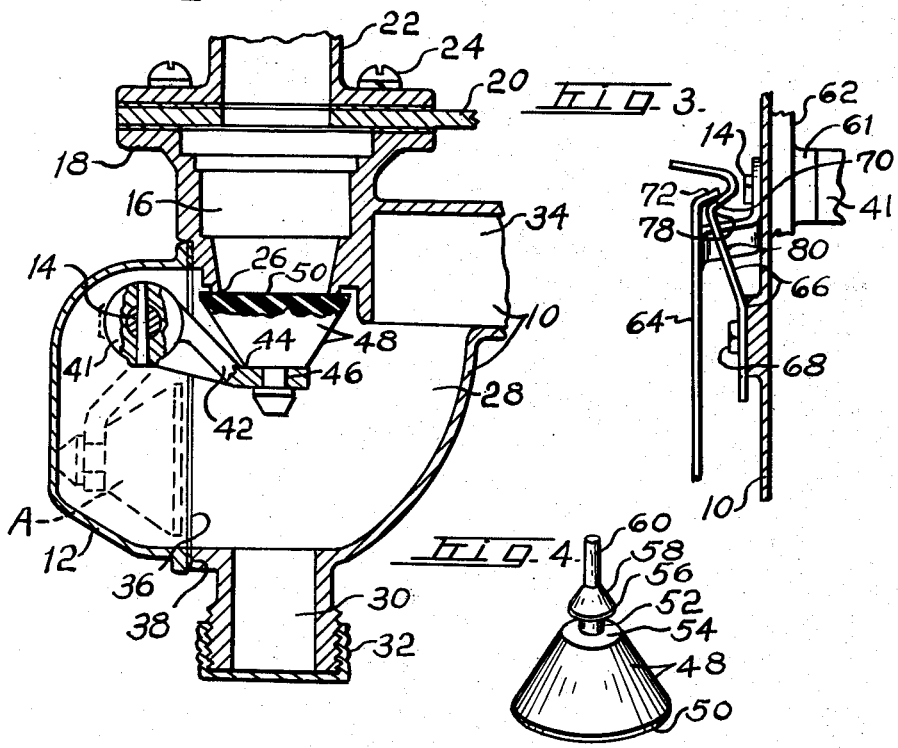
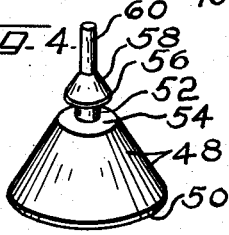
INVENTOR
DONALD D. HEAGERTY
BY
ATTORNEY Patented Nov. 24, 1953

2,660,396

UNITED STATES PATENT OFFICE 2,660,396

PIVOTED SELF-ALIGNING VALVE

Donald D. Heagerty, Syracuse, N. Y., assignor to Easy Washing Machine Corporation, Syracuse, N. Y., a corporation of Delaware Application December 23, 1948, Serial No. 66,883

1 Claim. (Cl. 251—10)

This invention relates to valves, and more particularly to a drainage valve adapted for use on washing machines.

In valves of the type described, usually of the low head type, it is usual to provide a clear passage for the flow of discharge therethrough, in order that lint and other substances which might otherwise clog the valve may be flushed through without lodging in the valve in a manner so as to prevent closure or manipulation.

The present invention is directed to a swinging gate valve in which the various parts, normally positioned out of the flow path when in open position, are especially formed so as to be unlikely to catch lint and other foreign matter.

Further, the structure is so arranged as to be economical of manufacture, composed of a minimum of parts, readily assembled and certain of action.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claim.

In the drawings, wherein like reference characters indicate like parts:

Figure 1 is a side view of a valve casing in which the invention is adapted for use;

Figure 2 is a transverse longitudinal section taken through the valve of Figure 1;

Figure 3 is a section taken substantially on the line 3—3 of Figure 1, showing the detent for securing the valve in closed or open position; and Figure 4 is a perspective view of the valve member prior to assembly in the valve shown.

In the drawings, there is shown a valve chamber or casing composed of a main body portion 10 and a cap 12 housing the valve actuating rock shaft 14. The casing is provided with an inlet duct 16 having an attachment flange 18 which is adapted to support the valve by clamping against a support member 20, a flanged connecting pipe 22 with its threaded fastenings 24 extending into flange 18 and being adapted to cooperate with the flange 18 to clamp the support plate 20 therebetween. The inlet duct 16 terminates within the body portion 10 in a valve seat 26. The main body portion 10 provides a chamber 28 having a sediment trap in the form of an outlet 30 provided with a screw cap 32 and an outlet duct 34 located at right angles to the inlet 16. The body portion 10 has an open side 36 with a seat 38 against which is secured the cap 12 as by screws 40.

The rock shaft 14 extends across the cap 12 and has keyed thereto a hub 41 having an arm 42, the end of which may be angularly offset as at 44 and provided with an aperture 46. The offset end of the arm 42 is such as to extend substantially parallel to the valve seat 26 with the aperture 46 centrally located with respect thereto when the valve is in closed position. A valve member 48 shown in detail in Figure 4, composed of rubber or other suitable resilient material, is of generally conical shape and provided with a face 50 adapted to engage the seat 26. The apex end of the member is provided with an annular groove 52 formed by a cone truncating surface or shoulder 54 the diameter of which is of the order of half the diameter of the seat and a flange or collar 56 which may have a tapered side face 58. The conical portion of the valve member defined by the face 50 and the shoulder 54 has an axial length of the order of the radius of said seat. The tapered side face leads into a stem 60 to assist in assembling the valve member in the aperture 46 of the arm 42, as is shown in Figure 2. The stem is of smaller diameter than the root diameter of the annular groove 52.

The composition of the valve member may be of molded rubber having a durometer hardness of 50 to 60, so that by extending the stem 60 through the aperture 46 and applying tension thereto, the flange 56 will be extended and shrunken in diameter and caused to slip through the aperture 46, whereupon releasing such tension, the flange 56 expands holding the valve member securely in place in the position shown in Figure 2. The stem 60 may, during the process, be stretched to the point of fracture, breaking the stem off or, if desired, the same may be clipped after assembly.

The valve operating rock shaft 14 extends through the wall 62 and an integral boss 61 of the cap 12, and is rigidly secured to an operating lever 64. In order to hold the valve closed in the position shown with a degree of force, there is provided a cam and follower in the form of a resilient cam member 66 secured as at 68 to the outside of the wall of the body 10, the latter having a sloped portion 70 adapted to engage a cam follower in the form of a bent end 72 of an extension 74 of the lever 64. It will be seen that by urging the lever in clockwise direction as shown in Figure 1, the cam sloped portion 70 will be depressed, permitting the follower 72 to ride over the hump 78 and engage the inclined portion 80 of the resilient member 66 to urge the valve to a wide open position as indicated at A in Figure 2. At the same time, when the valve is returned to closed position, the follower 72 is cammed to hold the valve member 48 tight on seat 26, by resiliency of the member 66 acting through the sloped portion 70.

It will be seen from the foregoing that a relatively simple valve structure is provided employing an arm 42 and the resilient valve member 48, both members of which are free of springs, washers, cotter keys and the like which would be likely to attract, catch and retain lint and other foreign matter. Furthermore, the resiliency of the valve member 48 and the relative dimensions of the member are such as to provide a somewhat universal mounting at the arm 42 and its point of attachment in the aperture 46, so that the valve surface 50 is sure to align and seat upon the annular valve seat 26 with uniform pressure about the rim of the valve seat.

Although a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claim for a definition of the limits of the invention.

What is claimed is:

A valve comprising an inlet and outlet connections and an intermediate valve chamber, said inlet leading to said chamber and terminating in a valve seat, a rock shaft traversing said chamber having an arm thereon, a valve member formed of resilient plastic material having a conical valve-engaging portion with a seat-engaging surface at its large end and a shoulder at its small end, the diameter of which is of the order of half the diameter of the seat, said conical portion having an axial length of the order of the radius of said seat and having an integral resilient stem extending from the small end of the conical portion, said stem having an integral collar thereon, said arm having an aperture therein through which said stem extends with the shoulder and collar on opposite sides, said collar and shoulder being spaced axially by an amount substantially the length of the arm aperture, said stem being of approximately the same diameter as said aperture and said collar being of a diameter and resiliency whereby said collar may be drawn by temporary elongation and diametral shrinking through said aperture, said stem and arm being the sole means for supporting said valve member, said aperture and arm being so located as to hold said member resiliently in substantial alignment with said seat when the seat-engaging surface is about to be positioned thereon.

DONALD D. HEAGERTY.

References Cited in the file of this patent

UNITED STATES PATENTS

| Number | Name | Date |
|---|---|---|
| 932,494 | Reeves | Aug. 31, 1909 |
| 1,451,025 | Kraft | Apr. 10, 1923 |
| 1,614,117 | Geldhof | Jan. 11, 1927 |
| 1,717,022 | Foulkrod | June 11, 1929 |
| 1,740,567 | Becker | Dec. 24, 1929 |
| 1,960,999 | Kaye | May 29, 1934 |
| 2,020,286 | Bittle | Nov. 12, 1935 |
| 2,057,233 | Esnard | Oct. 13, 1936 |
| 2,096,202 | Richeson | Oct. 19, 1937 |
| 2,291,603 | Barker | Aug. 4, 1942 |
| 2,314,653 | McDevitt | Mar. 23, 1943 |
| 2,368,887 | Schuler | Feb. 6, 1945 |
| 2,414,577 | Adair | Jan. 21, 1947 |
| 2,447,510 | Langdon | Aug. 24, 1948 |
| 2,454,077 | McEwen | Nov. 16, 1948 |

FOREIGN PATENTS

| Number | Country | Date |
|---|---|---|
| 10,940 | Denmark | of 1908 |
| 11,536 | Denmark | of 1908 |
| 588,831 | Great Britain | of 1947 |
| 897,256 | France | of 1944 |